(12) United States Patent
Kim et al.

(10) Patent No.: US 8,897,208 B2
(45) Date of Patent: Nov. 25, 2014

(54) SPACE FREQUENCY BLOCK CODE SIGNAL PROCESSING AND RELAYING SYSTEM

(75) Inventors: Eung Sun Kim, Suwon-si (KR); Young-Doo Kim, Suwon-si (KR); Tae Soo Kwon, Hwaseong-si (KR); Dae-Young Seol, Pohang-si (KR); Gi Hong Im, Pohang-si (KR); Ui Kun Kwon, Pohang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 834 days.

(21) Appl. No.: 12/068,157

(22) Filed: Feb. 4, 2008

(65) Prior Publication Data

US 2009/0040960 A1    Feb. 12, 2009

(30) Foreign Application Priority Data

Aug. 8, 2007    (KR) .................. 10-2007-0079555

(51) Int. Cl.
*H04W 4/00* (2009.01)
*H04L 12/28* (2006.01)
*H04J 3/16* (2006.01)
*H04B 7/155* (2006.01)
*H04L 1/06* (2006.01)
*H04L 1/00* (2006.01)

(52) U.S. Cl.
CPC .... *H04B 7/15542* (2013.01); *H04L 2001/0097* (2013.01); *H04L 1/0606* (2013.01)
USPC ........... 370/319; 370/341; 370/431; 370/437

(58) Field of Classification Search
CPC .................................................. H04L 1/0003
USPC ............... 370/319, 329, 341, 85.7, 431, 95.1, 370/437; 455/34.1, 34.2, 199.1
See application file for complete search history.

(56) References Cited

U.S. PATENT DOCUMENTS 6,665,521 B1    12/2003    Gorday et al.
2004/0022183 A1*   2/2004   Li et al. .................. 370/210
(Continued)

FOREIGN PATENT DOCUMENTS

KR    1020060070901 A    6/2006
KR    10-2006-0081352 A    7/2006
(Continued)

OTHER PUBLICATIONS

"Cooperative Multiple-Access in Fading Relay Channels," Communications, 2006. ICC '06. IEEE International Conference on, vol. 10, pp. 4532-4537, Jun. 2006 to Ozgur Yilmaz.*

(Continued)

*Primary Examiner* — Noel Beharry
*Assistant Examiner* — Abdelnabi Musa
(74) *Attorney, Agent, or Firm* — Sughrue Mion, PLLC

(57) ABSTRACT

A space frequency block code signal relaying system is provided. The space frequency block code signal relaying system includes a signal detecting unit which receives, via a radio channel, a source signal sent from a source station and detects the received signal; a relay signal generation unit which generates a relay signal corresponding with the source signal transmitted from the source station to a destination node based on the received signal, the source signal and the relay signal being signals encoded in a Space Frequency Block Code (SFBC) scheme; and a signal transmitting unit which transmits the relay signal to the destination node.

17 Claims, 6 Drawing Sheets

(56) References Cited

U.S. PATENT DOCUMENTS

| | | |
|---|---|---|
| 2006/0120477 A1 | 6/2006 | Shen et al. |
| 2006/0133530 A1 | 6/2006 | Kwak et al. |
| 2007/0150928 A1* | 6/2007 | Hottinen .................. 725/127 |
| 2007/0189151 A1* | 8/2007 | Pan et al. ................. 370/210 |
| 2008/0025248 A1* | 1/2008 | Naden ...................... 370/321 |
| 2008/0304593 A1* | 12/2008 | Khan et al. ............... 375/267 |
| 2009/0103472 A1* | 4/2009 | Ni et al. ................... 370/315 |
| 2009/0129499 A1* | 5/2009 | Kwak et al. .............. 375/267 |

FOREIGN PATENT DOCUMENTS

| | | |
|---|---|---|
| KR | 10-2006-0102185 A | 9/2006 |
| KR | 1020060111238 A | 10/2006 |
| KR | 1020070004370 A | 1/2007 |
| KR | 10-2007-0034408 A | 3/2007 |
| KR | 1020070037873 A | 4/2007 |
| WO | 2004038987 A2 | 5/2004 |

OTHER PUBLICATIONS

"Design of an OFDM Cooperative Space-Time Diversity System," Vehicular Technology, IEEE Transactions on, vol. 56, No. 4, pp. 2203-2215, Jul. 2007 to Oh-Soon et al.*

Communication dated Jun. 21, 2013, issued by the Korean Intellectual Property Office in counterpart Korean Application No. 10-2007-0079555.

* cited by examiner

SPACE FREQUENCY BLOCK CODE SIGNAL PROCESSING AND RELAYING SYSTEM

CROSS-REFERENCE TO RELATED APPLICATION

This application claims the benefit of Korean Patent Application No. 10-2007-0079555, filed on Aug. 8, 2007, in the Korean Intellectual Property Office, the entire disclosure of which is incorporated herein by reference.

BACKGROUND OF THE INVENTION

1. Field of the Invention

Methods and apparatuses consistent with the present invention relate to a space frequency block code signal processing system and a method for the same. More particularly, methods and apparatuses consistent with the present invention relate to a space frequency block code signal processing system and a method for the same, which receives a signal from a source station via a radio channel, and generates a space frequency block code signal using the received signal.

2. Description of Related Art

Currently, a number of users using wireless Internet has been exponentially increased, however, most of current wireless Internet services are unsuitable for an Internet service requiring a high speed data transmission rate, such as a multimedia service. In this regard, technologies for providing Internet services regardless of location and time while realizing lower costs are required by Internet users and service enterprisers.

A representative scheme for realizing a high speed data transmission rate is an Orthogonal Frequency Division Multiplexing (OFDM) scheme. However, the OFDM scheme still has various problems to be solved even though it has an advantage in which signals are transmitted without being significantly affected by a frequency-selective fading. Accordingly, a communication technology using a multi-antenna has lately attracted a great deal of attention as one of technologies of solving the above-mentioned problems.

Since a receiver of receiving signals by radio has limitations in terms of its volume, area, and power consumption, the multi-antenna is generally equipped in a transmitter. In this way, equipping a plurality of antennas in the transmitter makes it possible to reduce complexity of the receiver, and to improve reduction of performance due to a multi-path fading. Specifically, a transmit diversity (TX diversity) effect can be realized by equipping the plurality of antennas in the transmitter.

However, when it is assumed that the transmitter is a user's mobile terminal, there arises a problem that it is difficult to equip the plurality of antennas in the mobile terminal. That is, the user's mobile terminal is preferably manufactured in a relatively smaller size. However, since the plurality of antennas are required to be spaced apart from one another by a relatively great distance to realize the TX diversity effect using the plurality of antennas equipped in the mobile terminal, the plurality of antennas adversely affects the reduction of size of the mobile terminal. For example, to realize adequate TX diversity effect, the plurality of antennas is required to be equipped inside the mobile terminal in such a manner as to be placed apart from one another by a distance of about 4 to 10 wavelengths, however, this makes it a difficult task to meet a demand for compactness of the mobile terminal.

Therefore, there is a need for a space frequency block code signal processing system and a method for the same which realizes superior TX diversity effect while meeting the demand for the compactness of the transmitter including the user's mobile terminal.

SUMMARY OF THE INVENTION

An aspect of the present invention provides a space frequency block code signal relaying system and a method for the same which may be separated from a source station, receive, via a radio channel, a signal sent from the source station, and correspond with the source station.

An aspect of the present invention provides a space frequency block code signal relaying system and a method for the same which may achieve a high speed data transmission rate by uploading data through a source signal and a relay signal encoded in a Space Frequency Block Code (SFBC) scheme, and contribute to a reduction of size of the source station.

An aspect of the present invention provides a space frequency block code signal relaying system and a method for the same which may simplify a structure of the relaying system by processing a received signal transmitted from a source station in a time domain.

An aspect of the present invention provides a space frequency block code signal relaying system and a method for the same which may minimize a number of operations required for generating a relay signal by generating the relay signal through an operation in a time domain, thereby achieving simplification, and rapid processing speed.

Another aspect of the present invention provides a space frequency block code signal receiving system and a method for the same which may achieve a high speed data transmission rate by effectively decoding a source signal and a relay signal in a space frequency block code scheme.

Another aspect of the present invention provides a space frequency block code signal receiving system and a method for the same which may effectively decode a signal encoded in a space frequency block code scheme by estimating a source signal using a channel frequency response of a radio channel.

According to an aspect of the present invention, there is provided a space frequency block code signal relaying system including a signal detecting unit which receives, via a radio channel, a source signal sent from a source station and detects the received signal; a relay signal generation unit which generates a relay signal corresponding with the source signal transmitted from the source station to a destination node based on the received signal, the source signal and the relay signal being signals encoded in a Space Frequency Block Code (SFBC) scheme; and a signal transmitting unit which transmits the relay signal to the destination node.

In this instance, the relay signal generating unit may process the received signal in a time domain to generate the relay signal.

According to another aspect of the present invention, there is provided a space frequency block code signal receiving system including a signal detecting unit which receives, via a radio channel, a source signal sent from a source station and a relay signal sent from a relay station, and detects the received signals, the source signal and the relay signal being signals encoded in an SFBC scheme; a Fourier transformer which performs a Discrete Fourier Transform (DFT) with respect to the received signal to generate a frequency domain signal; and a spectrum estimation unit which estimates a spectrum of the source signal in a frequency domain based on the frequency domain signal.

In this instance, the spectrum estimation unit may use similarities among the channel frequency responses between adjacent subchannels, included in the radio channel, so as to estimate the spectrum of the source signal.

According to another aspect of the present invention, there is provided a space frequency block code signal relaying method including receiving, via a radio channel, a source signal sent from a source station, and detecting the received signal; generating a relay signal corresponding with the source signal transmitted from the source station to a destination node based on the received signal, the source signal and the relay signal being signals encoded in an SFBC scheme; and transmitting the relay signal to the destination node.

According to another aspect of the present invention, there is provided a space frequency block code signal receiving method, the receiving method including receiving, via a radio channel, a source signal sent from a source station and a relay signal sent from a relay station, and detecting the received signals, the source signal and the relay signal being signals encoded in an SFBC scheme; and performing a DFT with respect to the received signal to generate a frequency domain signal; and estimating a spectrum of the source signal in a frequency domain based on the frequency domain signal.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Figure 1:
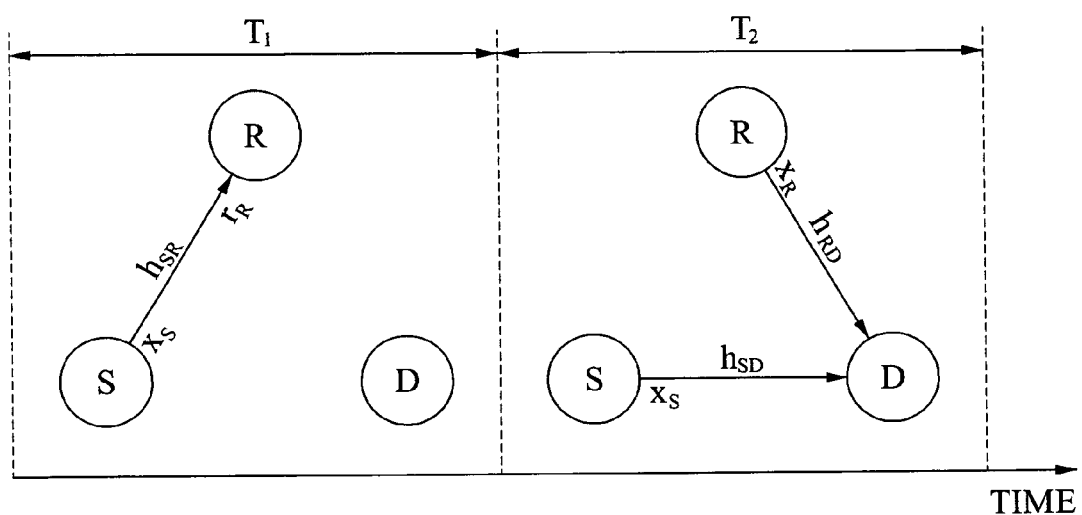
FIG. 1 is a diagram illustrating a signal moving path over time according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a diagram illustrating a signal moving path over time according to an exemplary embodiment of the present invention.

Referring to FIG. 1, 'S', 'R', and 'D' denote a source station, a relay system, and a destination node, respectively. Here, the source station may be a user's mobile terminal, and the destination node may be a base station.

The source station transmits, to the relay system, a source signal $x_S$ to be transmitted to the destination node in a time period T1. In this instance, a radio channel is formed between the source station and the relay system, and a vector of the radio channel is expressed as $h_{SR}$. In this instance, multi-paths may be present between the source station and the relay system. Thus, $h_{SR}$ may be a vector of a multi-path fading channel.

The relay system receives, via a radio channel, the source signal $x_S$ sent from the source station in the time period T1. In this instance, since the source signal $x_S$ is transmitted via the radio channel, a received signal $r_R$ received by the relay system is represented as $$r_R = \sqrt{E_{SR}} H_{SR} x_S + n_R, \quad \text{[Equation 1]}$$

where $n_R$ denotes a noise, $E_{SR}$ denotes an energy induced by a radio channel between the source station and the relay system, and $H_{SR}$ denotes a channel matrix with respect to a radio channel between the source station and the relay system.

Also, the relay system, which receives the source signal $x_S$ via a radio channel in the time period T1, produces a relay signal $x_R$ based on the received signal $r_R$. In this instance, the relay signal $x_R$ and the source signal $x_S$ are signals encoded in a space frequency block code scheme. Specifically, the source signal $x_S$ is more effectively transmitted to the destination node by the relay signal $x_R$ corresponding with the source signal $x_S$.

Here, both of the source station and the relay system serve as a virtual transmitter including a plurality of antennas, and thus the transmit diversity effect can be achieved. Accordingly, the transmit diversity effect can be achieved by using antennas of the relay system, even when a relatively smaller number of antennas are equipped in the source station. As a result, the source station can be fabricated in a relatively smaller size.

In this instance, the source station and the relay system send the source signal $x_S$ and the relay signal $x_R$ to the destination node in a time period T2, respectively. Here, the destination node may be a base station, and the relay system may be included in a generally installed relay station. In this instance, $h_{SD}$ denotes a channel vector of a radio channel formed between a source station and a destination node, and $h_{RD}$ denotes a channel vector of a radio channel formed between a relay system and a destination node.

Figure 2:
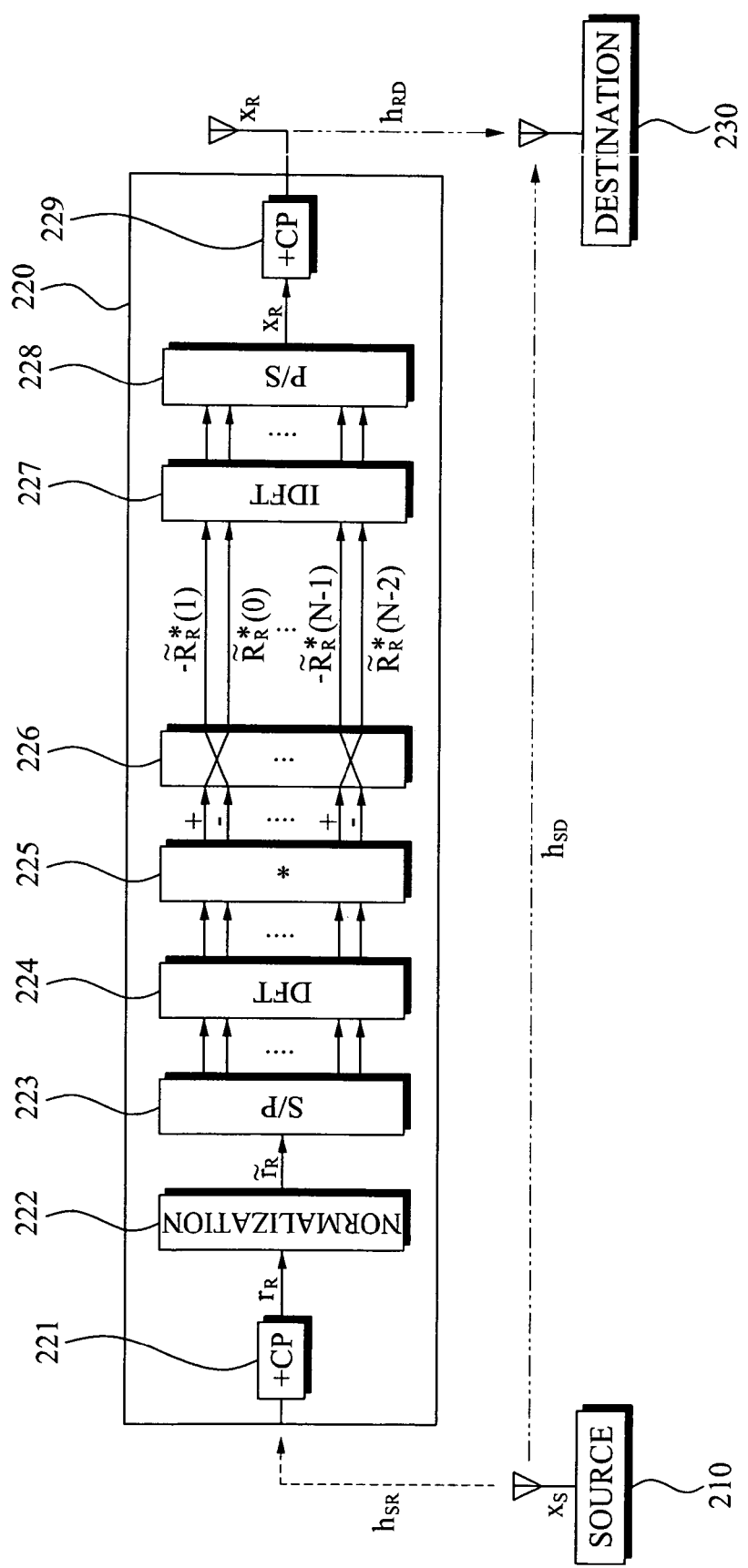
FIG. 2 is a diagram illustrating characteristics of a relay signal.

FIG. 2 is a diagram illustrating characteristics of a relay signal.

However, a process for generating a relay signal which will be hereinafter described with reference to FIG. 2 is merely illustrative of the present invention, and is not to be construed as a limitation thereof.

Referring to FIG. 2, a source station 210 transmits a source signal $x_S$ to a relay station 220 via a radio channel. Here, a channel vector of a radio channel formed between the source station 210 and the relay station 220 is expressed as $h_{SR}$.

When the signal received by the relay station 220 has a cyclic prefix, the cyclic prefix is removed through a cyclic prefix remover 221. The signal in which the cyclic prefix is removed may be expressed as a received signal $r_R$ received by the relay system. Also, the received signal $r_R$ may be represented as the above Equation 1.

In this instance, the received signal $r_R$ is normalized in such a manner as to have a unit energy through a normalization 222. That is, a unit energy-receiving signal $\tilde{r}_R$ may be represented as $$\tilde{r}_R = \frac{r_R}{\sqrt{E_{SR} + N_0}}, \quad \text{[Equation 2]}$$

where $N_0$ denotes $n_R^2$.

In this instance, the unit energy-receiving signal $\tilde{r}_R$ is converted through a serial to parallel converter 223, and converted into a frequency domain signal $\tilde{R}_R$ via a Discrete Fourier Transformer (DFT) 224.

A spectrum corresponding to a frequency component of an even number-th from among unit energy-receiving signals $\tilde{R}_R$ in a frequency domain may be expressed as $\tilde{R}_R$ (2l), and a spectrum corresponding to a frequency component of an odd number-th therefrom may be expressed as $\tilde{R}_R$ (2l+1). In this instance, l is an integral within a range of 0 to N/2−1.

The unit energy-receiving signal $\tilde{R}_R$ in the frequency domain is encoded through a conjugation unit 225 and a cross unit 226 by the following Equation 3, which is represented as $$\begin{bmatrix} -\tilde{R}_R^*(2l+1) \\ \tilde{R}_R^*(2l) \end{bmatrix}, \quad \text{[Equation 3]}$$

where l is an integral within a range of 0 to N/2−1.

Referring to Equation 3, all frequency components of $\tilde{R}_R$ are conjugated, and the sequent order of an odd number-th frequency component and an even number-th frequency component which are adjacent to each other are switched with each other.

In this instance, a signal encoded by Equation 3 is converted into a time domain signal through an Inverse Discrete Fourier Transformer (IDFT) 227, thereby producing a relay signal $x_R$. That is, when a relay signal is $x_R$ in a frequency domain, $x_R$ may be given by $$\begin{bmatrix} X_R(2l+1) \\ X_R(2l) \end{bmatrix} = \begin{bmatrix} -\tilde{R}_R^*(2l+1) \\ \tilde{R}_R^*(2l) \end{bmatrix}. \quad \text{[Equation 4]}$$

Referring to Equation 4, it can be seen that the relay signal represented by Equation 4 is encoded in a space frequency block code scheme.

Also, the relay signal $x_R$ in the frequency domain is converted into a time domain signal through the IDFT 227, and a signal converted into the time domain signal is integrated through a serial to parallel converter, thereby producing a relay signal $x_R$ in a time domain. Also, a cyclic prefix is added to $x_R$ by a cyclic prefix addition unit 228, as necessary, and thereby sent to a destination node 230.

Figure 3:
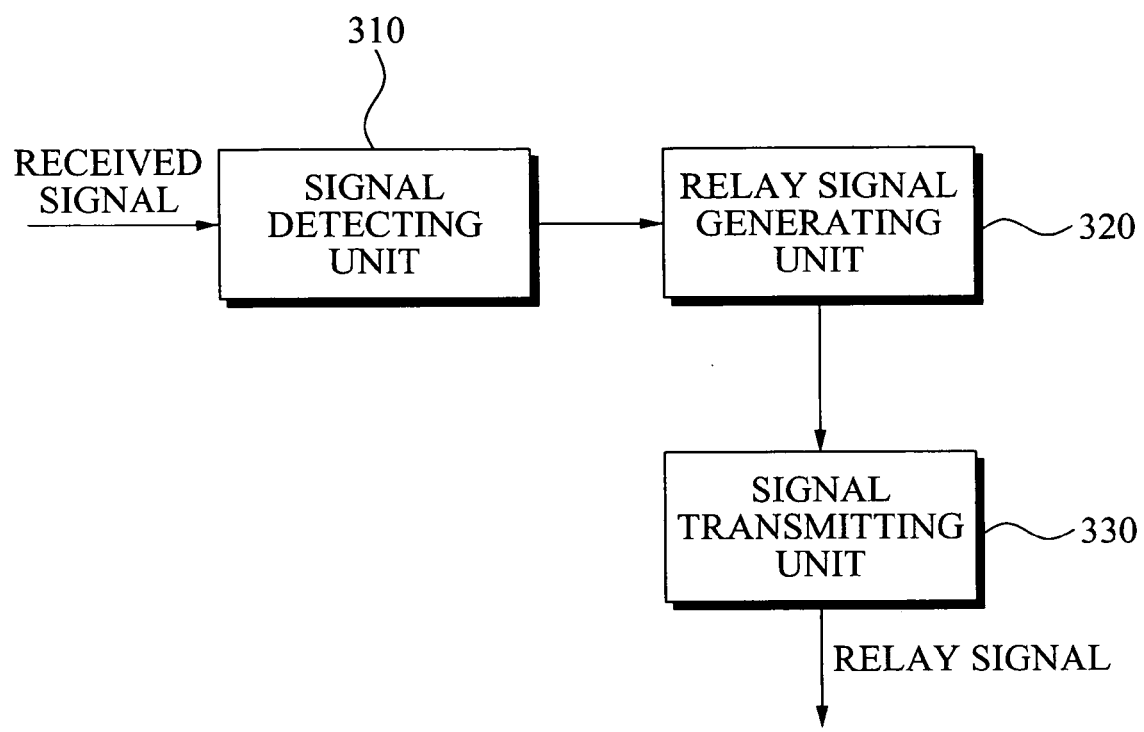
FIG. 3 is a block diagram illustrating a space frequency block code signal relaying system according to an exemplary embodiment of the present invention.

Referring to FIG. 3, the relay signal $x_R$ is produced through an operation in a frequency domain by using the DFT 224 of the relay station 220, however, the space frequency block code signal relaying system according to an exemplary embodiment of the invention may produce the relay signal $x_R$ through an operation in a time domain.

Specifically, for producing the relay signal $x_R$ through the operation in the frequency domain, multiplication between complex numbers is required to be performed (N/2)log$_2$(2N) times. However, according to the present exemplary embodiment of the invention, for producing the relay signal $x_R$ through the operation in the time domain, multiplication between complex numbers is required to be performed N times. Accordingly, a process for producing the relay signal $x_R$ illustrated in FIG. 3 may be more simplified.

FIG. 3 is a block diagram illustrating a space frequency block code signal relaying system according to an exemplary embodiment of the present invention.

Referring to FIG. 3, the space frequency block code signal relaying system according to the present exemplary embodiment of the invention includes a signal detecting unit 310, a relay signal generating unit 320, and a signal transmitting unit 330.

Detailed explanations with respect to FIG. 3 will be given relative to the above-mentioned detailed descriptions with respect to FIGS. 1 and 2.

The signal detecting unit 310 receives, via a radio channel, a source signal sent from a source station, and detects the received signal.

The source station may be a user's mobile terminal, and the space frequency block code signal relaying system according to the present exemplary embodiment of the invention may be a relay station. The source signal may include data intended to be finally transmitted to a destination node.

A radio channel is formed between the source station and the space frequency block code signal relaying system. Since the radio channel may be expressed as a channel vector, the source signal sent from the source station is not detected by the signal detecting unit 310 as is.

Specifically, referring again to FIG. 1, the source station transmits the source signal $x_S$, however, the signal detecting unit 310 detects the received signal $r_R$ due to the presence of the radio channel. That is, the signal detecting unit 310 detects the received signal $r_R$ given by Equation 1.

Also, the relay signal generating unit 320 generates a relay signal $x_R$ corresponding with the source signal $x_S$ transmitted from the source station to a destination node based on the received signal $r_R$. In this instance, the source signal $x_S$ and the relay signal $x_R$ are signals encoded in a Space Frequency Block Code (SFBC) scheme.

Specifically, the source station transmits the source signal $x_S$ to the destination node, and simultaneously the space frequency block code signal relaying system according to the present exemplary embodiment of the invention transmits the relay signal $x_R$ to the destination node, and thus the source station and the space frequency block code signal relaying system substantially serve as one transmitter, which makes it possible to realize a relatively great transmit diversity effect. Moreover, a number of antennas of the source station is reduced while realizing the transmit diversity effect, thereby achieving compactness of the source station.

In this instance, the relay signal generating unit 320 processes the received signal $r_R$ in a time domain, thereby producing the relay signal $x_R$. Specifically, the relay signal generating unit 320 processes the received signal $r_R$ in the time domain and produces the relay signal $x_R$, and thus a number of operations required for generating the relay signal $x_R$ is greatly reduced. That is, the process for producing the relay signal $x_R$ as illustrated in FIG. 2 may be replaced with an operation process in a time domain, thereby facilitating to produce the relay signal $x_R$.

In this instance, the relay signal generating unit 320 may generate the relay signal $x_R$ based on a conjugate value of the received signal $r_R$ in the time domain. In this instance, the relay signal generating unit 320 may generate the relay signal $x_R$ by performing a conjugate operation and a time-shift operation with respect to the received signal $r_R$ in the time domain.

When it is assumed that a unit energy-receiving signal in a time domain is denoted by $\tilde{r}_R$, a unit energy-receiving signal in a frequency domain is denoted by $\tilde{R}_R$, and a conjugate value of $\tilde{R}_R$ is denoted by $\tilde{R}_R^*$, a time domain signal corresponding to $\tilde{R}_R^*$ may be represented as $$\tilde{r}_R^*(-n)_N = r_c(n). \qquad [\text{Equation 5}]$$

That is, the time domain signal corresponding to $\tilde{R}_R^*$ may be expressed as $\tilde{r}_R^*(-n)_N$ by using a symmetry property of a DFT. In this instance, a subscript of N is obtained by a modulo operation. For example, in the case $(A)_N$, an operation of returning a remainder when dividing A by N is performed. When performing the DFT with respect to both sides of Equation 5, the following Equation 6 can be obtained, which is given by $$\tilde{R}_R^* = R_c = W r_c, \qquad [\text{Equation 6}]$$

where W denotes a root of unity complex multiplicative constants.

In this instance, frequency components of an even number-th and odd number-th $\tilde{R}_R^*$ may be calculated by 'De' and 'Do' of the following Equation 7, respectively, which is represented as $$D_e = [1,0,1,0,1 \ldots 1,0,1,0]^T$$

$$D_o = [0,1,0,1 \ldots 0,1,0,1]^T. \qquad [\text{Equation 7}]$$

That is, when multiplying either $\tilde{R}_R^*$ or $R_c$ by 'De' of Equation 7, a frequency component of an even number-th of either $\tilde{R}_R^*$ or $R_c$ may be obtained. Also, when multiplying either $\tilde{R}_R^*$ or $R_c$ by 'Do' of Equation 7, a frequency component of an odd number-th of either $\tilde{R}_R^*$ or $R_c$ may be obtained.

Accordingly, an odd number-th frequency component $R_o(k)$ and an even number-th frequency component $R_e(k)$ of either $\tilde{R}_R^*$ or $R_c$ are represented as $$R_o(k) = R_c(k) D_o(k)$$

$$R_e(k) = R_c(k) D_e(k). \qquad [\text{Equation 8}]$$

where k denotes a frequency index.

The multiplication operation in the frequency domain of Equation 8 may be replaced with a convolution operation in a time domain, and which is represented as $$r_o(n) = r_c(n) *_N \delta_o(n)$$

$$r_e(n) = r_c(n) *_N \delta_e(n), \qquad [\text{Equation 9}]$$

where $*_N$ denotes a circular convolution operation with respect to a length of N.

In this instance, both $\delta_e$ and $\delta_o$ are '0' except in the case of either n=0 or n=N/2 and thus $r_e$ and $r_o$ may be represented as $$r_o(n) = \frac{1}{2} r_c(n) + \frac{1}{2} r_c(n - N/2)_N \qquad [\text{Equation 10}]$$

$$r_e(n) = \frac{1}{2} r_c(n) - \frac{1}{2} r_c(n - N/2)_N.$$

That is, complex operations in the frequency domain are not required to be performed so as to obtain the odd number-th frequency component $R_o(k)$ and the even number-th frequency component $R_e(k)$ of either $\tilde{R}_R^*$ or $R_c$. As shown in Equation 10, $r_o(n)$ and $r_e(n)$ corresponding to $R_o(k)$ and $R_e(k)$, respectively, may be obtained using a conjugate operation and a time-shift operation with respect to $\tilde{r}_R$.

Accordingly, the relay signal $x_R$ may be obtained by using a frequency shift property of the DFT, and which is given by $$x_R(n) = \frac{1}{2} r_c(n)(W_N^{-n} - W_N^n) + \frac{1}{2} r_c(n - N/2)_N (W_N^{-n} + W_N^n) \qquad [\text{Equation 11}]$$

$$= r_c(n) \cdot j\sin(2\pi n/N) + r_c(n - N/2)_N \cdot \cos(2\pi n/N)$$

Finally, the relay signal generating unit 320 of the present exemplary embodiment of the invention may generate the relay signal $x_R$ using the conjugate operation and the time-shift operation in a time domain, as shown in Equation 11, without performing any operation in a frequency domain. Specifically, as shown in Equation 4, an operation of generating the relay signal $X_R$ in the frequency domain may be replaced with an operation of generating the relay signal $x_R$ in the time domain. Accordingly, a large number of multiplication operations between complex numbers due to the operation in the frequency domain is greatly reduced.

Also, the signal transmitting unit 330 transmits the relay signal $x_R$ to a destination node. As a result, the destination node may receive the relay signal of $x_R$ and the source signal $x_S$ encoded in the space frequency block code scheme, and finally the destination node receives the source signal $x_S$ at a relatively higher-speed.

Figure 4:
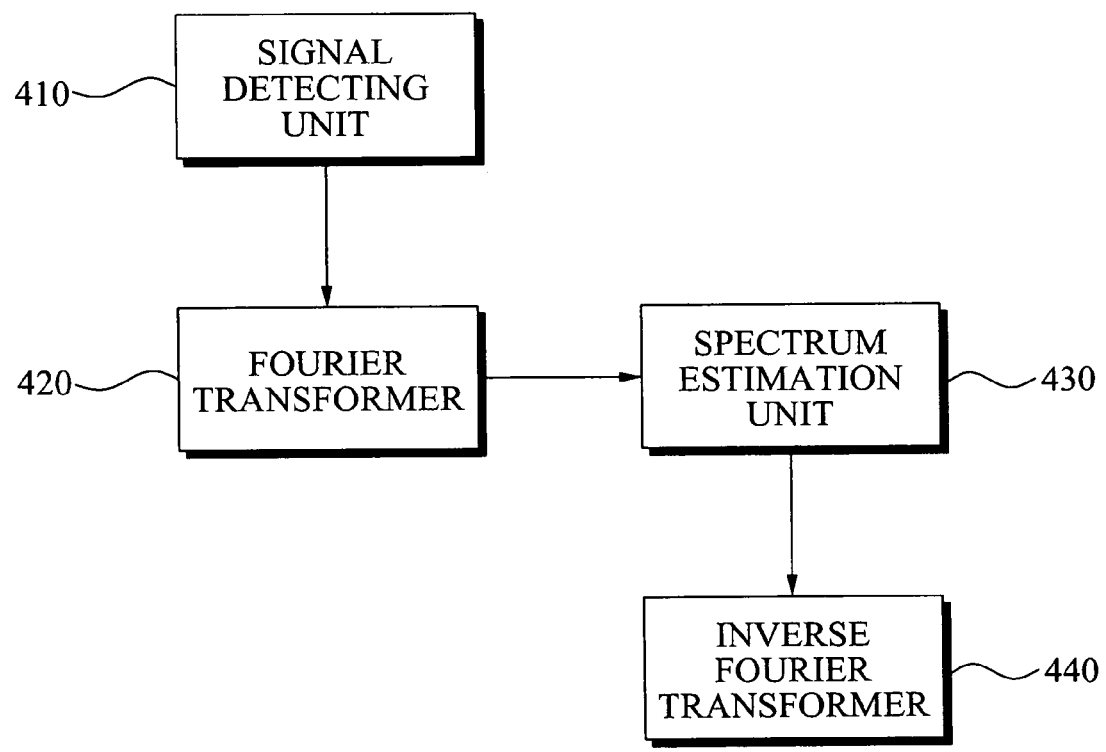
FIG. 4 is a block diagram illustrating a space frequency block code signal receiving system according to an exemplary embodiment of the present invention.

FIG. 4 is a block diagram illustrating a space frequency block code signal receiving system according to an exemplary embodiment of the present invention.

Referring to FIG. 4, the space frequency block code signal receiving system according to the present exemplary embodiment of the invention includes a signal detecting unit 410, a Fourier transformer 420, a spectrum estimation unit 430, and an inverse Fourier transformer 440.

The space frequency block code signal receiving system according to the present exemplary embodiment of the invention may be equipped in a receiver, and in particular, equipped in a base station whereby it may be used for an application of receiving a signal uploaded by a user's terminal.

The signal detecting unit 410 receives, via a radio channel, a source signal sent from a source station and a relay signal sent from a relay station, and detects the received signals. The source signal and the relay signal are signals encoded in an SFBC scheme.

Specifically, the source station may send the source signal $x_S$ to the base station, and the relay signal $x_R$ generated in the relay station illustrated in FIG. 3 may be sent from the relay station to the base station. In this instance, the source signal $x_S$ and the relay signal $x_R$ may be transmitted via a radio channel to the base station, the signal detecting unit 410 may detect the received signals transmitted via a radio channel.

A received signal $r_D$ received by the signal detecting unit 410 is represented as $$r_D = \sqrt{E_{SR}} H_{RD} x_R + \sqrt{E_{SD}} H_{SD} x_S + n_D, \qquad [\text{Equation 12}]$$

where $r_D$ denotes a received signal, $H_{RD}$ denotes a channel matrix of a radio channel formed between a relay station and a destination node (receiving system), $E_{SR}$ denotes an energy induced by the radio channel formed between the relay station and the destination node (receiving system), $H_{SD}$ denotes a channel matrix of a radio channel formed between a source station and a destination node (receiving system), $E_{SD}$ denotes an energy induced by the radio channel formed between the source station and the destination node (receiving system), and $n_D$ denotes a noise.

In this instance, when referring to FIG. 2 and Equations 1 and 2, $x_R$ is represented as $$x_R = W^H PS\{W\tilde{r}_R\}^* \quad \text{[Equation 13]}$$

$$= \sqrt{\frac{E_{SR}}{E_{SR}+N}} W^H PS\{WH_{SR}x_S\}^* + \frac{N_R}{\sqrt{E_{SR}+N_0}}.$$

'S' and 'P' of Equation 13 are obtained using a Kronecker product (⊗), and which is represented as $$S = I_{\frac{N}{2} \times \frac{N}{2}} \otimes \begin{bmatrix} 1 & 0 \\ 0 & -1 \end{bmatrix} \quad \text{[Equation 14]}$$

$$P = I_{\frac{N}{2} \times \frac{N}{2}} \otimes \begin{bmatrix} 0 & 1 \\ 1 & 0 \end{bmatrix}.$$

The received signal $r_D$ is obtained by using Equation 13, and which may be represented as $$r_D = \sqrt{\frac{E_{RD}E_{SR}}{E_{SR}+N_0}} H_{RD}W^H PS\{WH_{SR}x_S\}^* + \quad \text{[Equation 15]}$$

$$\sqrt{E_{SD}} H_{SD}x_S + n_D + \sqrt{\frac{E_{RD}}{E_{SR}+N_0}} H_{RD}n_R.$$

Referring to Equation 15, a segment of $H_{RD}W^H PS\{WH_{SR}x_S\}^*$ may be represented as $$H_{RD}W^H PS\{WH_{SR}x_S\}^* = W^H \Lambda_{RD} PS\Lambda_{SR}^* \{Wx_S\}^* \quad \text{[Equation 16]}$$

$$= W^H \Lambda_{RD} P\Lambda_{SR}^* S\{Wx_S\}^*,$$

where $\Lambda_{RD}$ denotes a frequency response of a radio channel between a relay station and a destination node (receiving system), and $\Lambda_{SR}$ denotes a frequency response of a radio channel between a source station and a relay station, and which are given by $\Lambda_{RD}=WH_{RD}W^H$ and $\Lambda_{SR}=WH_{SR}W^H$, respectively.

As for subchannels included in the radio channel, similarities among channel frequency responses between adjacent subchannels are present. Accordingly, when using $\Lambda_{SR}(2k) \approx \Lambda_{SR}(2k+1)$, Equation 16 may be expressed as $$H_{RD}W^H PS\{WH_{SR}x_S\}^* = W^H \Lambda_{RD} PS\Lambda_{SR}^* \{Wx_S\}^* \quad \text{[Equation 17]}$$

$$= W^H \Lambda_{RD} P\Lambda_{SR}^* S\{Wx_S\}^*$$

$$\cong W^H \Lambda_{RD} \Lambda_{SR}^* PS\{Wx_S\}^*$$

$$\cong W^H \Lambda_{EQ} PS\{Wx_S\}^*,$$

where $\Lambda_{EQ}=\Lambda_{RD}\Lambda_{SR}^-$.

Finally, when Equation 17 is substituted into Equation 15, and a noise is normalized to have variance of $N_0/2$, the normalized received signal of $r_D'$ may be represented as $$r_D' = \sqrt{\gamma_1} W^H \Lambda_{EQ} PS\{Wx_S\}^* + \sqrt{\gamma_2} H_{SD}x_S + n. \quad \text{[Equation 18]}$$

Here, $\gamma_1$ and $\gamma_2$ of Equation 18 are given by $$\gamma_1 = \frac{(E_{SR}/N_0)E_{RD}}{1 + E_{SR}/N_0 + \sum_{m=0}^{L_{RD}} |h_{RD}(m)|^2 E_{RD}/N_0} \quad \text{[Equation 19]}$$

$$\gamma_2 = \frac{(E_{SR}/N_0)E_{SD}}{1 + E_{SR}/N_0 + \sum_{m=0}^{L_{RD}} |h_{RD}(m)|^2 E_{RD}/N_0},$$

where $L_{RD}$ denotes a length of a channel memory between the relay system and the destination node.

In this instance, an equalization with respect to $r_D'$ of Equation 18 may be performed in a frequency domain by using conventional equalization schemes with reference to Equation 19.

Finally, the signal detecting unit 410 detects the normalized received signal $r_D'$ as shown in Equation 18.

The normalized received signal $r_D'$ is converted into a frequency domain signal through the Fourier transformer 420. When using Equation 18, a frequency domain signal $R_D'$ generated by the Fourier transformer 420 is represented as $$R_D' = \sqrt{\gamma_1}\Lambda_{EQ}PSX_S^* + \sqrt{\gamma_2}\Lambda_{SD}X_S + n \quad \text{[Equation 20]}$$

Also, the spectrum estimation unit 430 estimates a spectrum of the source signal $X_S$ in a frequency domain based on the frequency domain signal $R_D'$. In this instance, the spectrum estimation unit 430 may estimate the spectrum of the source signal $X_S$ using channel frequency responses of the radio channel.

Also, the spectrum estimation unit 430 estimates the spectrum of the source signal $X_S$ using similarities among the channel frequency responses between adjacent subchannels included in the radio channel. In this instance, the spectrum estimation unit 430 may estimate a spectrum of an adjacent frequency component of the source signal $X_S$ for each group, thereby estimating the spectrum of the source signal $X_S$.

Referring to Equation 20, the frequency domain signal $R_D'$ may be divided into an even number-th frequency component and an odd number-th frequency component as shown in the following Equation 21, which is represented as $$R_D'(2k) = \sqrt{\gamma_1}\Lambda_{EQ}X_S^*(2k+1) + \sqrt{\gamma_2}\Lambda_{SD}(2k)X_S(2k) + N(2k)$$

$$R_D^*(2k+1) = -\sqrt{\gamma_1}\Lambda^*_{EQ}(2k+1)X_S(2k) + \sqrt{\gamma_2}\Lambda^*_{SD}(2k+1)X_S^*(2k+1) + N^*(2k+1). \quad \text{[Equation 21]}$$

When using similarities between channel frequency responses, which are present between adjacent subchannels, and Equation 21, Equation 22 may be obtained, which is represented as $$R_k' = \begin{bmatrix} R_D'(2k) \\ R_D'^*(2k+1) \end{bmatrix} \quad \text{[Equation 22]}$$

$$\cong \begin{bmatrix} \Lambda_{SD}'(2k) & -\Lambda_{EQ}'(2k) \\ \Lambda_{EQ}'^*(2k) & \Lambda_{SD}'^*(2k) \end{bmatrix} \begin{bmatrix} X(2k) \\ X^*(2k+1) \end{bmatrix} +$$

$$\begin{bmatrix} N(2k) \\ N^*(2k+1) \end{bmatrix}$$

$$= \Lambda_k' X_k' + N_k'.$$

When a signal encoded using the space frequency block code scheme is decoded under a MMSE (Minimum Mean-Square Error) criterion with reference to Equation 22, the following Equation 23 is obtained, which is represented as $$Y_k = \Lambda_k'^H R_k' = \begin{bmatrix} \tilde{\Lambda}(k) & 0 \\ 0 & \tilde{\Lambda}(k) \end{bmatrix} X_k' + \Lambda_k'^H N_k' \quad \text{[Equation 23]}$$

$$\tilde{\Lambda}(k) = \gamma_1 |\Lambda_{EQ}(2k)|^2 + \gamma_2 |\Lambda_{SD}(2k)|^2$$

$$\hat{X}_k' = \left(\Lambda_k'^H \Lambda_k' - \frac{1}{SNR} I_{2\times 2}\right)^{-1} Y_k = \begin{bmatrix} \hat{X}_S(2k) \\ \hat{X}_S^*(2k+1) \end{bmatrix},$$

where $\hat{X}_S$ denotes an estimation value of $X_S$.

Finally, the source signal of $X_S$ in the frequency domain may be estimated as $$\hat{X}_S = [\hat{X}_S(0), \hat{X}_S(1), \hat{X}_S(2) \ldots \hat{X}_S(N-1)]^T. \quad \text{[Equation 24]}$$

Also, the inverse Fourier transformer 440 performs an IDFT with respect to the estimation value $\hat{X}_S$ of the source signal of $X_S$ in a frequency domain, thereby generating an estimation value of the source signal of $X_S$ in a time domain. Finally, the estimation value of the source signal of $X_S$ in the time domain is represented as $$\hat{x}_S = W^H \hat{X}_S \quad \text{[Equation 25]}$$

Accordingly, the space frequency block code signal relaying system according to the present exemplary embodiment of the invention may generate the relay signal corresponding with the source signal by using the source signal sent from the source station, and the space frequency block code signal receiving system according to the present exemplary embodiment of the invention, which is equipped in the destination node or the base station, may appropriately decode the source signal and the relay signal. As a result, the present invention may achieve a high data transmission rate, and contribute to downsizing of the source station.

Figure 5:
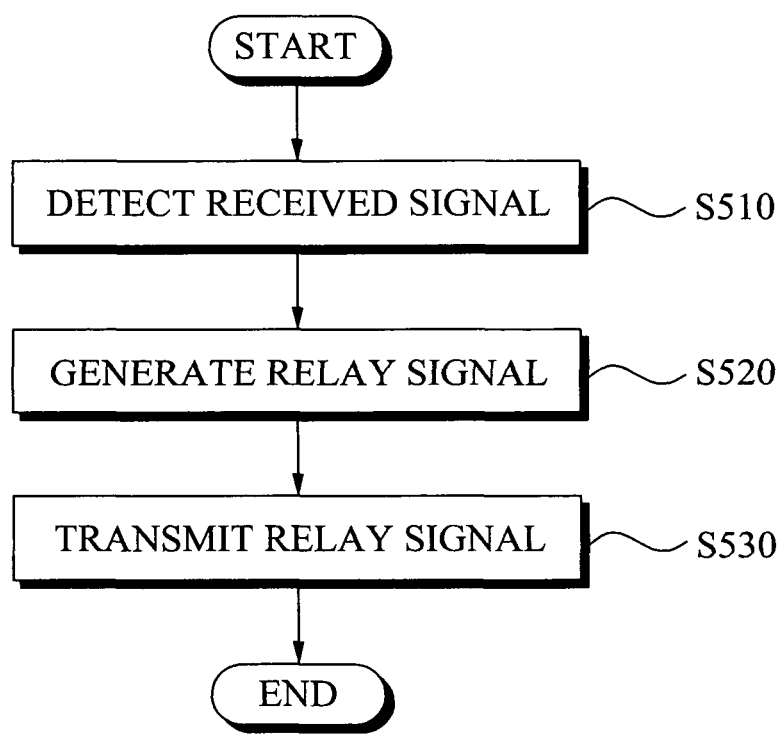
FIG. 5 is an operation flowchart illustrating a space frequency block code signal relaying method according to an exemplary embodiment of the present invention.

FIG. 5 is an operation flowchart illustrating a space frequency block code signal relaying method according to an exemplary embodiment of the present invention.

Referring to FIG. 5, in operation S510, the space frequency block code signal relaying method according to the present exemplary embodiment of the invention receives, via a radio channel, a source signal transmitted from a source station, and detects the received signal.

Also, in operation S520, the space frequency block code signal relaying method according to the present exemplary embodiment of the invention generates a relay signal corresponding with the source signal transmitted from the source station to a destination node based on the received signal. Here, the source signal and the relay signal are signals encoded using the SFBC scheme.

In this instance, operation S520 of generating a relay signal may be an operation of generating the relay signal by processing the received signal in a time domain.

Also, operation S520 of generating a relay signal may be an operation of generating the relay signal based on a conjugate value of the received signal in a time domain.

Also, operation S520 of generating a relay signal may be an operation of generating the relay signal by performing a conjugate operation and a time-shift operation with respect to the received signal in a time domain.

Also, operation S520 of generating a relay signal may be an operation of generating the relay signal by using Equation 11.

In operation S530, the space frequency block code signal relaying method according to the present exemplary embodiment of the invention transmits the relay signal to the destination node.

Figure 6:
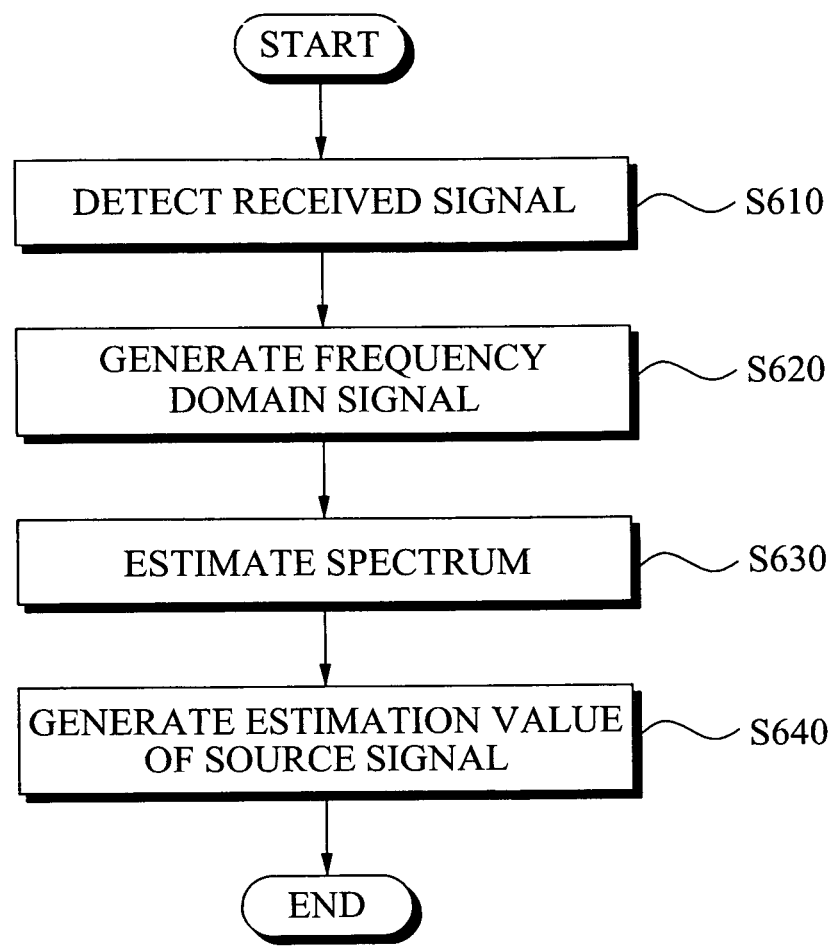
FIG. 6 is an operation flowchart illustrating a space frequency block code signal receiving method according to an exemplary embodiment of the present invention.

FIG. 6 is an operation flowchart illustrating a space frequency block code signal receiving method according to an exemplary embodiment of the present invention.

In operation S610, the space frequency block code signal receiving method according to the present exemplary embodiment of the invention receives, via a radio channel, a source signal sent from a source station and a relay signal sent from a relay station, and detects the received signals. Here, the source signal and the relay signal are signals encoded in the SFBC scheme.

In operation S620, the space frequency block code signal receiving method according to the present exemplary embodiment of the invention performs the DFT with respect to the received signals and generates a frequency domain signal.

In operation S630, the space frequency block code signal receiving method according to the present exemplary embodiment of the invention estimates a spectrum of the source signal in a frequency domain based on the frequency domain signal.

In this instance, operation S630 of estimating a spectrum may be an operation of estimating a spectrum of the source signal by using a channel frequency response of a radio channel.

Also, operation S630 of estimating a spectrum may be an operation of estimating a spectrum of the source signal by using similarities among the channel frequency responses between adjacent subchannels included in the radio channel.

Also, operation S630 of estimating a spectrum may be an operation of estimating a spectrum of the source signal by estimating a spectrum of an adjacent frequency component of the source signal for each group.

In operation S640, the space frequency block code signal receiving method according to the present exemplary embodiment of the invention performs the IDFT with respect to an estimation value of the source signal in the frequency domain, and generates an estimation value of the source signal in a time domain.

Operations not described with reference to FIGS. 5 and 6 are the same as corresponding operations already described in FIGS. 1 through 4, and thus detailed descriptions with respect to the operations will be hereinafter omitted.

The space frequency block code signal relaying method and the space frequency block code signal receiving method according to the above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

As described above, according to the present invention, the space frequency block code signal relaying system and the method for the same can be separated from the source station, receive, via a radio channel, a signal sent from the source station, and correspond with the source station.

According to the present invention, the space frequency block code signal relaying system and the method for the same can achieve a high speed data transmission rate by uploading data through the source signal and the relay signal encoded in the SFBC scheme, and contribute to a reduction of size of the source station.

According to the present invention, the space frequency block code signal relaying system and the method for the same can simplify a structure of the relaying system by processing the received signal transmitted from the source station in the time domain.

According to the present invention, the space frequency block code signal relaying system and the method for the same can minimize the number of operations required for generating the relay signal by generating the relay signal through an operation in the time domain, thereby achieving simplification, and rapid processing speed.

According to the present invention, the space frequency block code signal receiving system and the method for the same can achieve a high speed data transmission rate by effectively decoding the source signal and the relay signal in the space frequency block code scheme.

According to the present invention, the space frequency block code signal receiving system and the method for the same can effectively decode the signal encoded in the space frequency block code scheme by estimating the source signal using the channel frequency response of the radio channel.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A space frequency block code signal relaying system, the relaying system comprising:
   a relay station comprising a receiver configured to receive, via a radio channel, a first source signal sent from a source station and detect the received signal in a first time period;
   a relay signal processor configured to generate, in the first time period, a relay signal corresponding with a second source signal transmitted from the source station to a destination node based on the received first source signal, the first source signal and the relay signal being signals encoded in a Space Frequency Block Code (SFBC) scheme; and
   a signal transmitter configured to transmit the relay signal to the destination node in a second time period,
   wherein the second source signal transmitted from the source station to the destination station is transmitted directly from the source station to the destination node in the second time period without using the relaying system,
   wherein the relay signal is generated in the first time period equal to a sum of a result of a conjugate value and a result of a time shift operation and a convolution operation on the received first source signal of a time domain, and
   wherein the destination node does not detect the first source signal in the first time period.

2. The relaying system of claim 1, wherein the relay signal processor is further configured to perform a conjugate operation and a Lime-shift operation with respect to the received signal in the time domain to generate the relay signal.

3. The relaying system of claim 1, wherein the destination node is a base station, and the source station is a mobile station.

4. The relaying system of claim 1, wherein the source station transmits the source signal to the destination node and the space frequency block code signal relaying system simultaneously transmits the relay signal to the destination node.

5. A space frequency block code signal receiving system, the receiving system comprising:
   a receiver configured to receive, via a radio channel, a source signal sent from a source station and a relay signal sent from a relaying system in a second time period, and detect the received signals, the source signal and the relay signal being signals encoded in a Space Frequency Block Code (SFBC) scheme;
   a Fourier transformer configured to perform a Discrete Fourier Transform (DFT) with respect to the received signal to generate a frequency domain signal; and
   a spectrum estimation processor configured to estimate a spectrum of the source signal in a frequency domain based on the frequency domain signal,
   wherein the source signal sent from the source station is transmitted directly from the source station to the receiving system in the second time period without using the relaying system,
   wherein the relay signal is generated in a first time period equal to a sum of a result of a conjugate value and a result of a time shift operation and a convolution operation on the received source signal of a time domain at the relaying system, and
   wherein the receiving system does not detect the source signal sent from the source station in the first time period.

6. The receiving system of claim 5, wherein the spectrum processor is further configured to use channel frequency response of the radio channel to estimate the spectrum of the source signal.

7. The receiving system of claim 5, wherein the spectrum processor is further configured to use similarities among the channel frequency responses between adjacent subchannels, included in the radio channel, so as to estimate the spectrum of the source signal.

8. The receiving system of claim 5, wherein the spectrum processor is further configured to estimates a spectrum of an adjacent frequency component of the source signal for each group so as to estimate the spectrum of the source signal.

9. The receiving system of claim 5, further comprising an inverse Fourier transformer configured to performs an Inverse Discrete Fourier Transform (IDFT) with respect to an estimation value of the source signal of the frequency domain so as to generate the estimation value of the source signal in a time domain.

10. A space frequency block code signal relaying method of a relaying system, the relaying method comprising:
    receiving at the relaying system, via a radio channel, a first source signal sent from a source station, and detecting the received signal in a first time period;
    generating a relay signal, in the first time period, corresponding with a second source signal transmitted from the source station to a destination node based on the received first source signal, the first source signal and the relay signal being signals encoded in a Space Frequency Block Code (SFBC) scheme; and
    transmitting the relay signal to the destination node in a second time period, wherein the second source signal transmitted from the source station to the destination station is transmitted directly from the source station to the destination in the second time period without using the relaying system, wherein the relay signal is generated in the first time period equal to a sum of a result of a conjugate value and a result of a time shift operation and a convolution operation on the received first source signal of the time domain, and wherein the destination node does not detect the first source signal in the first time period.

11. The relaying method of claim 10, wherein the generating of the relay signal performs a conjugate operation and a time-shift operation with respect to the received signal in the time domain to generate the relay signal.

12. A space frequency block code signal receiving method, the receiving method comprising:

receiving, via a radio channel, a source signal sent from a source station and a relay signal sent from a relaying system in a second time period, and detecting the received signals, the source signal and the relay signal being signals encoded in a Space Frequency Block Code (SFBC) scheme; and performing a Discrete Fourier Transform (DFT) with respect to the received signal to generate a frequency domain signal; and estimating a spectrum of the source signal in a frequency domain based on the frequency domain signal, wherein the source signal sent from the source station is transmitted directly from the source station in the second time period without using the relaying system, wherein the relay signal is generated in the first time period equal to a sum of a result of a conjugate value and a result of a time shift operation and a convolution operation on the received source signal of the time domain at the relaying system, and wherein the receiving system does not detect the source signal sent from the source station in the first time period.

13. The receiving method of claim 12, wherein the estimating of the spectrum uses channel frequency response of the radio channel to estimate the spectrum of the source signal.

14. The receiving method of claim 13, wherein the estimating of the spectrum uses similarities among the channel frequency responses between adjacent subchannels, included in the radio channel, so as to estimate the spectrum of the source signal.

15. The receiving method of claim 12, wherein the estimating of the spectrum estimates a spectrum of an adjacent frequency component of the source signal for each group so as to estimate the spectrum of the source signal.

16. The receiving method of claim 12, further comprising performing an Inverse Discrete Fourier Transform (IDFT) with respect to an estimation value of the source signal of the frequency domain to generate the estimation value of the source signal in a time-domain.

17. A non-transitory computer-readable recording medium storing a program for implementing a space frequency block code signal relaying method of a relaying system, the relaying method comprising:

receiving at the relaying system, via a radio channel, a first source signal sent from a source station, and detecting the received signal in a first time period;

generating a relay signal, in the first time period, corresponding with a second source signal transmitted from the source station to a destination node based on the received first source signal, the first source signal and the relay signal being signals encoded in a Space Frequency Block Code (SFBC) scheme; and transmitting the relay signal to the destination node in a second time period, wherein the second source signal transmitted from the source station to the destination node is transmitted directly from the source station to the destination node in the second time period without using the relaying system, wherein the relay signal is generated in the first time period equal to a sum of a result of a conjugate value and a result of a time shift operation and a convolution operation on the received first source signal of the time domain, and wherein the destination node does not detect the first source signal in the first time period.

* * * * *